(12) United States Patent
Brickett

(10) Patent No.: US 7,329,163 B2
(45) Date of Patent: Feb. 12, 2008

(54) ROPE-SEVERING DEVICE

(75) Inventor: Benjamin J. Brickett, Eliot, ME (US)

(73) Assignee: Blue Water Concepts, Inc., Eliot, ME (US)

( * ) Notice: Subject to any disclaimer, the term of this patent is extended or adjusted under 35 U.S.C. 154(b) by 328 days.

(21) Appl. No.: 11/118,671

(22) Filed: Apr. 29, 2005

(65) Prior Publication Data

US 2006/0075637 A1    Apr. 13, 2006

Related U.S. Application Data

(60) Provisional application No. 60/618,310, filed on Oct. 13, 2004.

(51) Int. Cl.
*B63B 22/18* (2006.01)

(52) U.S. Cl. .................. 441/23; 114/221 A; 83/950
(58) Field of Classification Search ............ 114/221 A; 83/196–200, 950; 441/23
See application file for complete search history.

(56) References Cited

U.S. PATENT DOCUMENTS 2,755,550 A * 7/1956 Benjamin ..................... 30/180
3,628,205 A * 12/1971 Starkey et al. ................ 441/25

\* cited by examiner

*Primary Examiner*—Ed Swinehart
(74) *Attorney, Agent, or Firm*—Hayes Soloway PC

(57) ABSTRACT

A rope-severing device includes a first sleeve having a first axis. A second sleeve is provided abutting and slideably oriented with the first sleeve. The second sleeve has a second axis, wherein the first axis and the second axis are at least one of coaxial and parallel. A sharp object is mounted at least partially within the first sleeve.

18 Claims, 8 Drawing Sheets

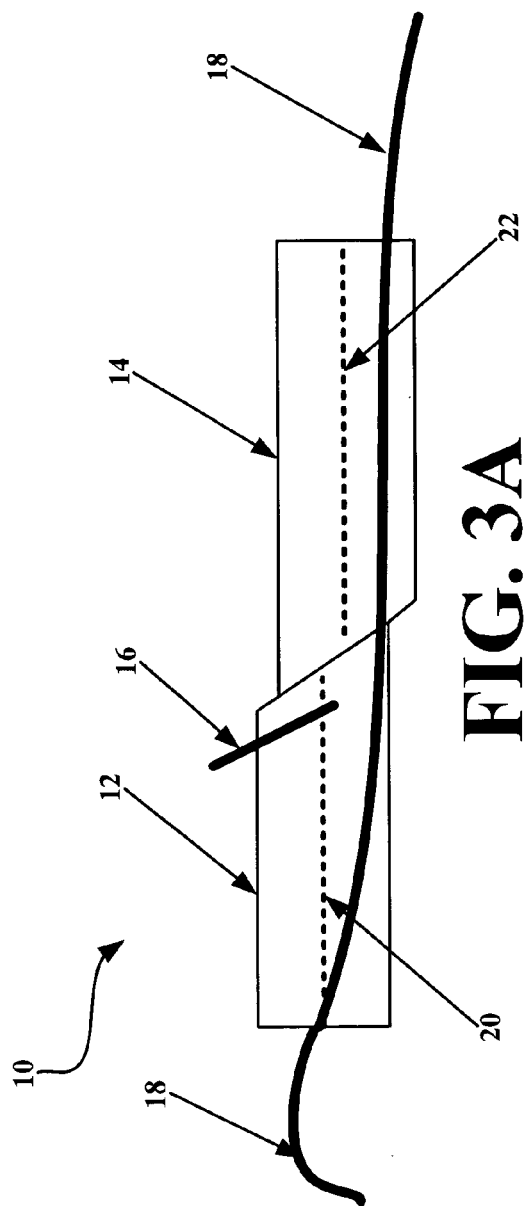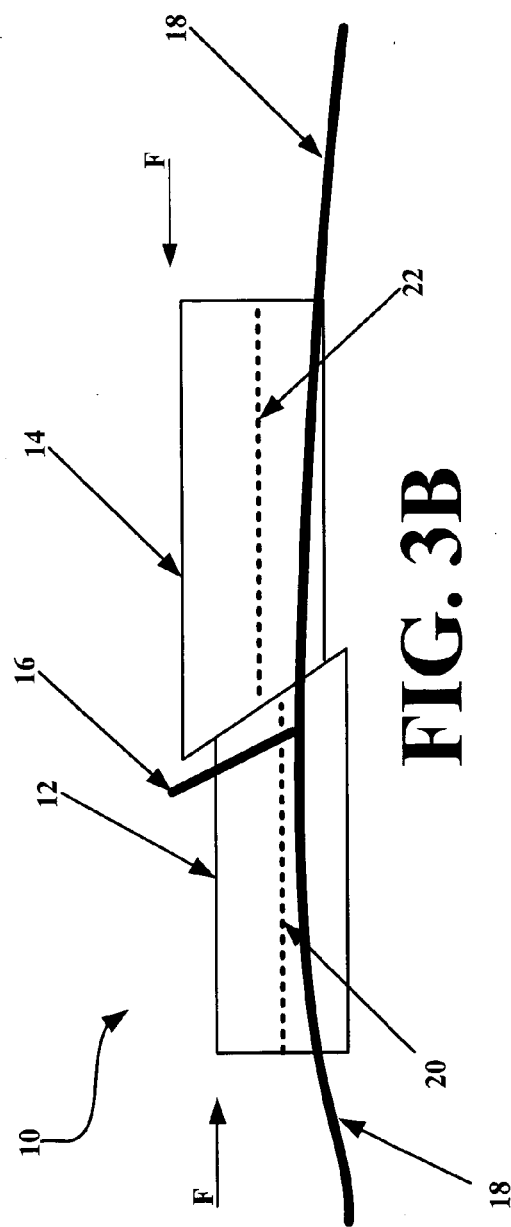

ROPE-SEVERING DEVICE

CROSS-REFERENCE TO RELATED APPLICATION

This application claims the benefit of U.S. provisional patent application Ser. No. 60/618,310, filed Oct. 13, 2004, and entitled "Rope-Severing Device", which is incorporated herein by reference in its entirety.

FIELD OF THE INVENTION

The present invention is in the field of fishing apparatus and, specifically, is directed to safety equipment for fishing apparatus.

BACKGROUND OF THE INVENTION

Presently, the fishing industry has many unintentional, harmful effects on marine life. For instance, endangered right whales are regularly entangled and killed by encounters with fixed gear. Fixed gear is fishing gear that is left at sea for a period of time, normally attached to buoys. Another marine creature routinely harmed, and often killed by fixed gear, is the sea turtle. Sea turtles will run into fixed gear, become entangled, and either suffer serious abrasions from fishing rope or fatal injuries.

To protect whales, fixed gear is often equipped with "weak links" attaching fishing rope to buoys. The concept behind the weak link is that if whales become entangled in the fixed gear, the weak links will break and the released rope will no longer entangle the whales. However, weak links are not a practical solution for sea turtles. The fixed gear puts more tension on the weak links than a sea turtle can manage. Sea turtles can weigh anywhere from 80 pounds to 1400 pounds and can attain a shell length of 30 to 75 inches, but fixed gear can weigh as much as 4000 pounds. Designing a weak link that will break for sea turtles without snapping from the weight of fishing gear is difficult, if not impossible. New technology is needed that can protect marine life, such as sea turtles, from fishing gear, including fixed gear.

Thus, a heretofore unaddressed need exists in the industry to address the aforementioned deficiencies and inadequacies.

SUMMARY OF THE INVENTION

Embodiments of the present invention provide an apparatus and method for severing a rope.

Briefly described, in architecture, one embodiment of the system, among others, can be implemented as follows. A rope-severing device includes a first sleeve having a first axis. A second sleeve is provided abutting and slideably-oriented with the first sleeve. The second sleeve has a second axis, wherein the first axis and the second axis are at least one of coaxial and parallel. A sharp object is mounted at least partially within the first sleeve.

The present invention is also understood to be a method of severing a rope, which may be implemented, in one embodiment of the system, as follows: sleeving a first sleeve and a second sleeve along a rope; attaching a first sleeve to the rope; abutting the first sleeve against the second sleeve; causing the first sleeve to slide in relation to the second sleeve; and pressing the rope against a sharp object mounted within one of the sleeves.

Other systems, methods, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 3A is a cross-sectional view of the rope-severing device, in accordance with the first exemplary embodiment of the invention, in a pre-compressive force position.

FIG. 3B is a cross-sectional view of the rope-severing device of FIG. 3A, in accordance with the first exemplary embodiment of the invention, in a partially post-compressive force position.

DETAILED DESCRIPTION

Figure 1:
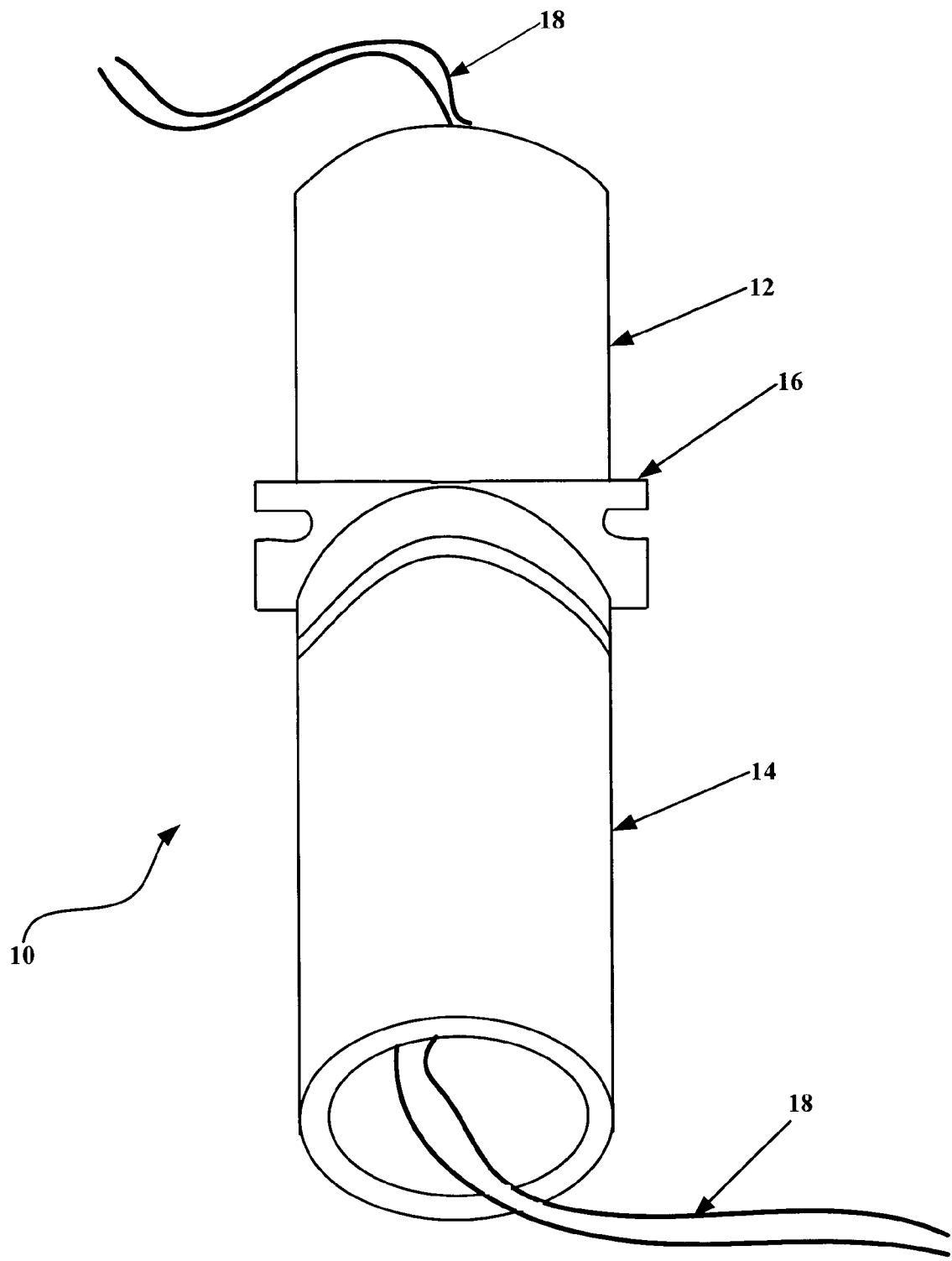
FIG. 1 is a perspective view of a rope-severing device, in accordance with a first exemplary embodiment of the invention.
Figure 2:
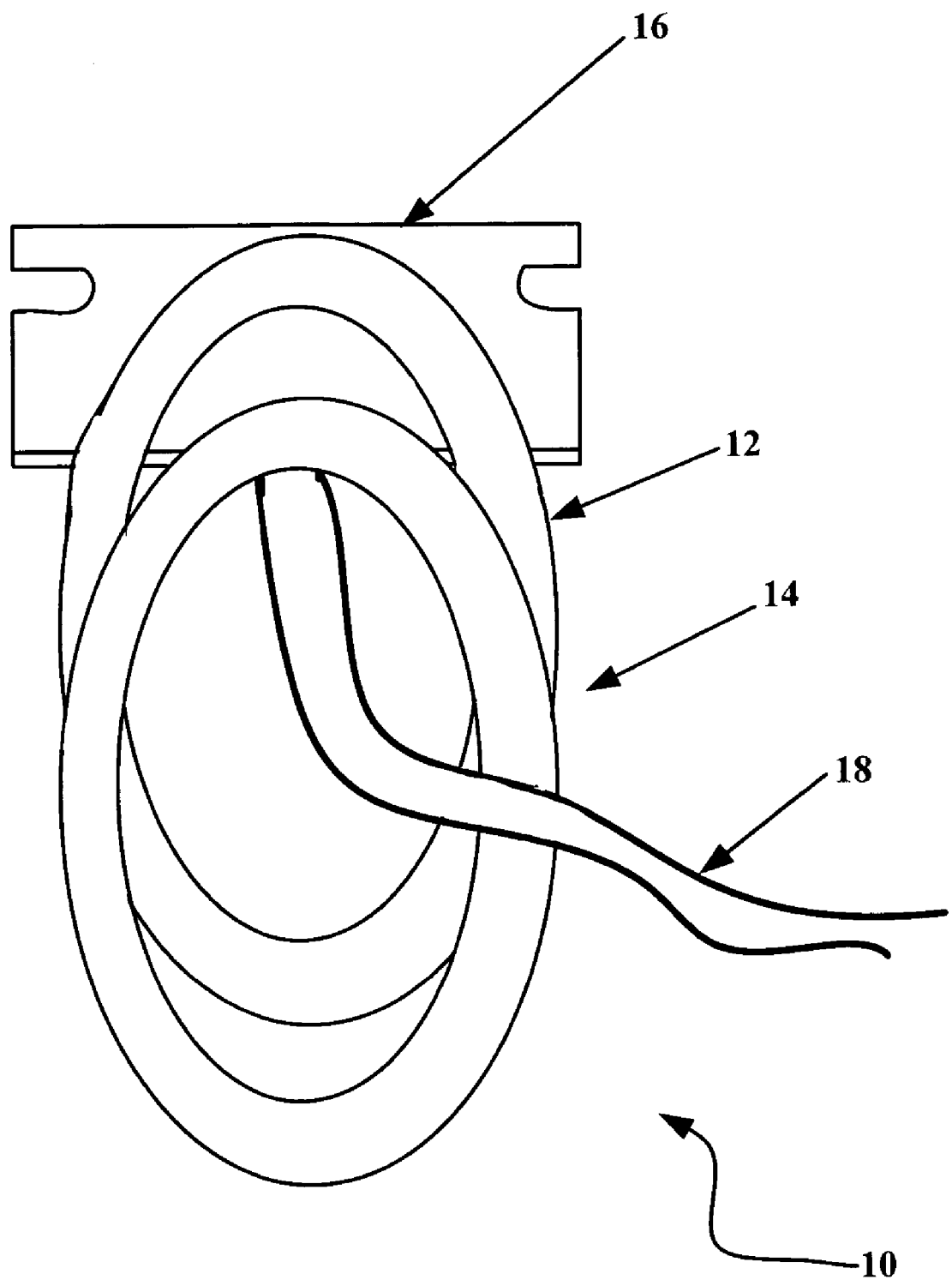
FIG. 2 is an end view of the rope-severing device, in accordance with the first exemplary embodiment of the invention.

FIG. 1 is a perspective view of a rope-severing device 10, in accordance with a first exemplary embodiment of the invention. FIG. 2 is an end view of the rope-severing device 10, in accordance with the first exemplary embodiment of the invention. The rope-severing device 10 includes a first sleeve 12 and a second sleeve 14. The second sleeve 14 is abutting the first sleeve 12 and is slideably-oriented with the first sleeve 12. A sharp object 16 is mounted at least partially within the first sleeve 12.

Operation of the invention to sever a rope 18 requires the application of a compressive force on the first sleeve 12 and second sleeve 14. FIGS. 3A and 3B are cross-sectional views of the rope-severing device 10 in accordance with the first exemplary embodiment of the invention. FIG. 3A is a cross-sectional view of the rope-severing device, in accordance with the first exemplary embodiment of the invention, in a pre-compressive force position. FIG. 3B is a cross-sectional view of the rope-severing device of FIG. 3A, in accordance with the first exemplary embodiment of the invention, in a partially post-compressive force position (partially post-compressive in the sense that compressive force may cause the sleeves 12, 14 to slide further than is shown.). As can be seen, as a result of the orientation of the two sleeves 12, 14, a compressive force F applied to the sleeves 12, 14 causes a sliding displacement of the sleeves 12, 14 (illustrated by the difference of positioning of the sleeves 12, 14 between FIG. 3A and FIG. 3B). The sharp object 16 is positioned such that the sliding displacement will cause the sleeves 12, 14 to press a rope 18, which has been inserted through the sleeves 12, 14, against the sharp object 16. It can be seen that a first axis 20 of the first sleeve 12 and a second axis 22 of the second sleeve 14 are initially substantially parallel (see FIG. 3A) before a compressive force F is applied and become substantially parallel (see FIG. 3B) after the compressive force F is applied. The first axis 20 and second axis 22 may also become momentarily coaxial during the sliding displacement between FIG. 3A and FIG. 3B.

In a marine environment, it is believed that marine wildlife that has come into contact with rope 18 used in fixed gear will slide along a length of the rope 18 before becoming entangled. When that marine wildlife encounters the rope-severing device 10, it is expected that the marine wildlife will apply sufficient compressive force F to the sleeves 12,14 to sever the rope 18.

Figure 4:
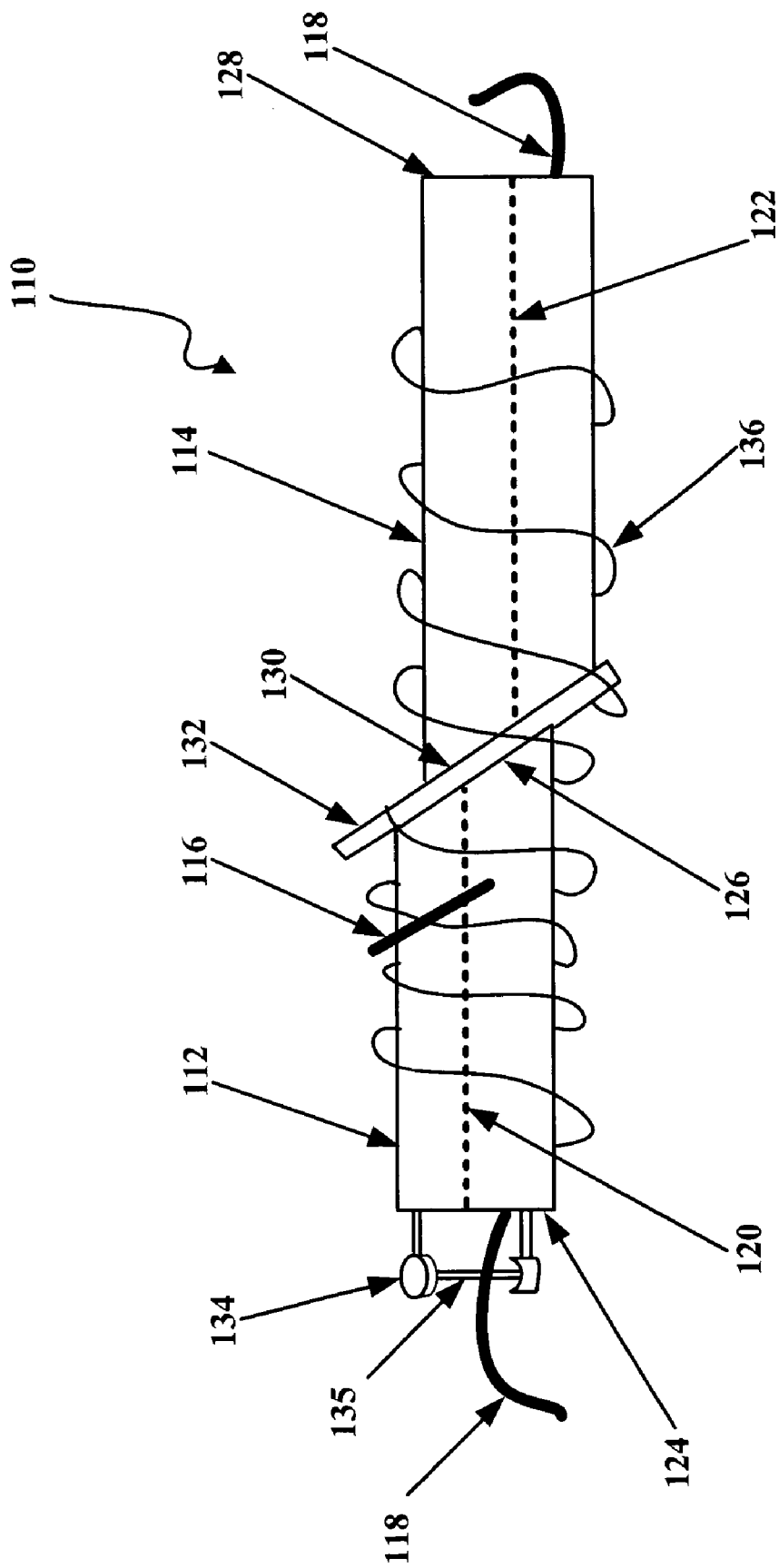
FIG. 4 is a side view of the rope-severing device, in accordance with a second exemplary embodiment of the invention.

FIG. 4 is a side view of a rope-severing device 110, in accordance with a second exemplary embodiment of the invention. The rope-severing device 110 may include a first sleeve 112 having a first axis 120, a first flat end 124 that is substantially perpendicular to the first axis 120, and a first angular end 126 that is angular to the first axis 120. The rope-severing device 110 may also include a second sleeve 114 having a second axis 122, a second flat end 128 that is substantially perpendicular to the second axis 122, and a second angular end 130 that is angular to the second axis 122. The second sleeve 114 abuts the first sleeve 112 at the first and second angular ends 126, 130. The rope-severing device 110 may also include a sharp object 116 mounted at least partially within the first sleeve 112.

The second exemplary embodiment of the invention may further include a track 132 and an attachment mechanism 134. The track 132 attaches the first sleeve 112 to the second sleeve 114, while allowing and guiding the sliding displacement of the two sleeves 112, 114. The attachment mechanism 134 allows one of the sleeves 112, 114 to attach to the rope 118. Attaching one of the sleeves 112, 114 to the rope 118 allows the rope 118 to be severed by applying force to one of the sleeves 112, 114, with tension from the rope 118 providing force on the other sleeve 112, 114, thereby creating the compressive force. The attachment mechanism 134 may be, for instance, a pin 135 inserted through the rope 118 and held by one of the sleeves 112, 114, as is shown in FIG. 4. The second exemplary embodiment may also include an elastic member 136 connecting the first sleeve 112 to the second sleeve 114. The elastic member 136 (shown as a spring in FIG. 4) would work to hold the sleeves 112, 114 in a pre-compressive force position.

Figure 5:
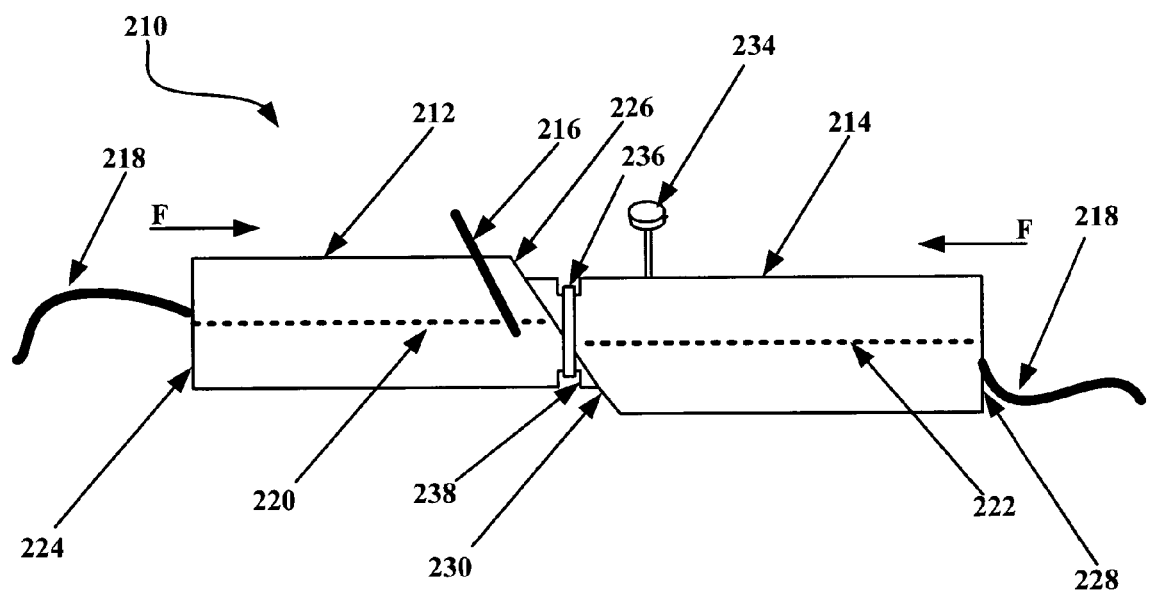
FIG. 5 is a side view of the rope-severing device, in accordance with a third exemplary embodiment of the invention.

FIG. 5 is a side view of the rope-severing device 210, in accordance with a third exemplary embodiment of the invention. The rope-severing device 210 may include a first sleeve 212 having a first axis 220, a first flat end 224 that is substantially perpendicular to the first axis 220, and a first angular end 226 that is oblique to the first axis 220. The rope-severing device 210 may also include a second sleeve 214 having a second axis 222, a second flat end 228 that is substantially perpendicular to the second axis 222, and a second angular end 230 that is oblique to the second axis 222. The angular ends 226, 230 may be at an angle approximately between twenty-five and seventy-five degrees, relative to the first and second axes 220, 222. The second sleeve 214 abuts the first sleeve 212 at the first and second angular ends 226, 230. The rope-severing device 210 may also include a sharp object 216 mounted at least partially within the first sleeve 212.

The third exemplary embodiment of the invention may further include an attachment mechanism 234. The attachment mechanism 234 allows one of the sleeves 212, 214 to attach to the rope 218. Attaching one of the sleeves 212, 214 to the rope 218 allows the rope 218 to be severed by applying force to the other of the two sleeves 212, 214, with tension from the rope 218 providing force on the other sleeve 212, 214, thereby creating the compressive force F.

The third exemplary embodiment of the rope-severing device 210 may also include a retaining member 236 connecting the first sleeve 212 to the second sleeve 214. The retaining member 236 would work to hold the sleeves 212, 214 in a proximate, pre-compressive force position. The retaining member 236 may, for instance, be a tie wrap or similar material. The retaining member 236 may, for instance, sit within grooves 238 preformed in the sleeves 212, 214. The retaining member 236 may have a known, limited strength, such that, for instance, applying twenty pounds of compressive force may snap the retaining member 236, allowing the sleeves 212, 214 to slide, relative to each other, along the first and second angular ends 226, 230, which causes the sharp object 216 to sever the rope 218.

Figure 6:
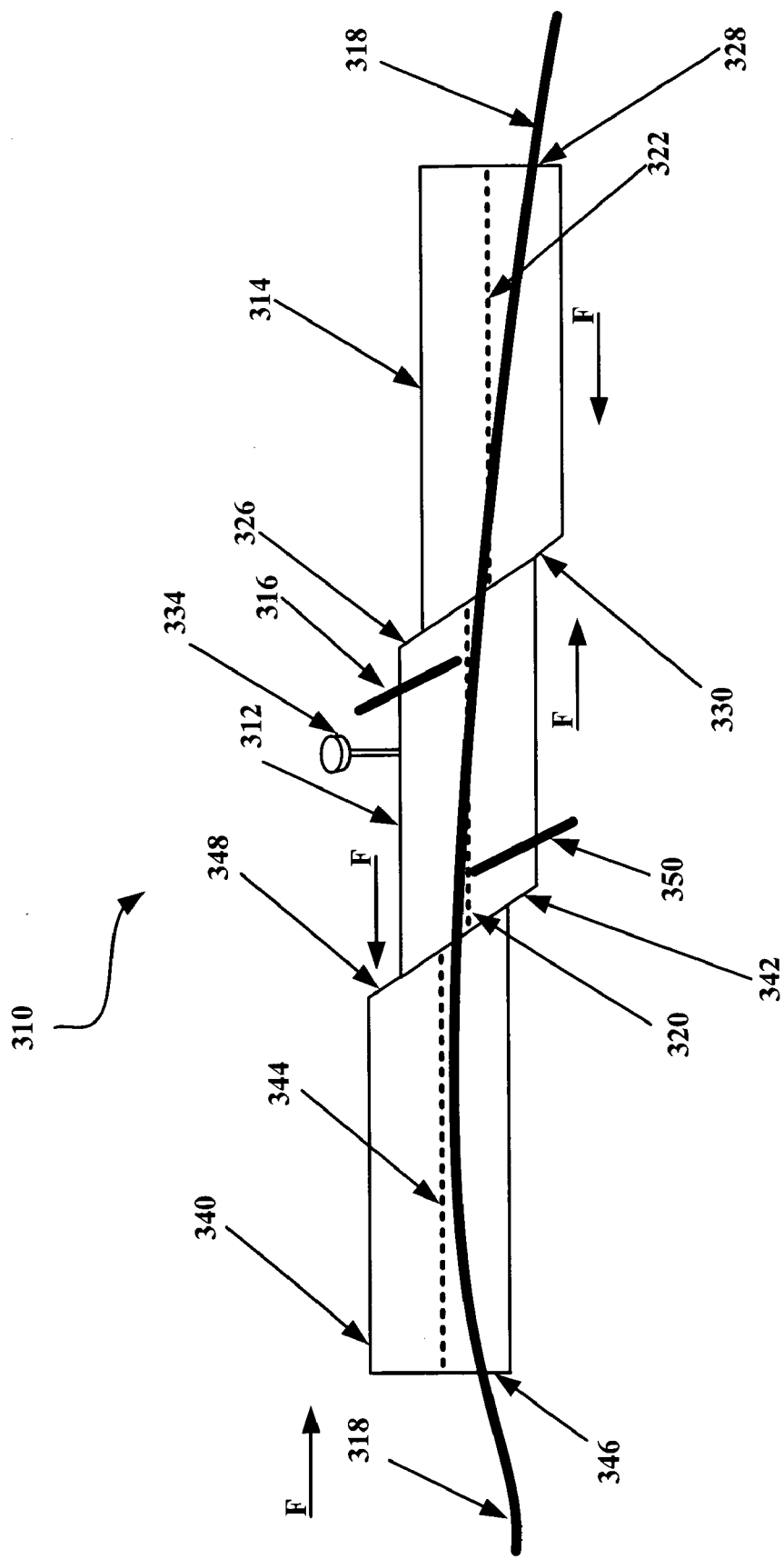
FIG. 6 is a cross-sectional view of the rope-severing device, in accordance with a fourth exemplary embodiment of the invention.

FIG. 6 is a cross-sectional view of the rope-severing device 310, in accordance with a fourth exemplary embodiment of the invention. The rope-severing device 310 may include a first sleeve 312 having a first axis 320 and a first angular end 326 that is oblique to the first axis 320. The rope-severing device 310 may also include a second sleeve 314 having a second axis 322, a second flat end 328 that is substantially perpendicular to the second axis 322, and a second angular end 330 that is oblique to the second axis 322. The second sleeve 314 abuts the first sleeve 312 at the first and second angular ends 326, 330. The rope-severing device 310 may also include a sharp object 316 mounted at least partially within the first sleeve 312.

The rope-severing device 310 further includes a third sleeve 340 mounted proximate to the first sleeve 312. In accordance with this fourth exemplary embodiment, the first sleeve 312 may have an additional angular end 342 that is oblique to the first axis 320. The third sleeve 340 has a third axis 344, a third flat end 346 that is substantially perpendicular to the third axis 344, and a third angular end 348 that is oblique to the third axis 344. The third sleeve 340 abuts the first sleeve 312 at the third and additional angular ends 348, 342. The rope-severing device 310 may also include a second sharp object 350 mounted at least partially within the first sleeve 312.

The fourth exemplary embodiment of the invention may further include an attachment mechanism 334 connected to the first sleeve 312. The attachment mechanism 334 allows the first sleeve 312 to attach to the rope 318. Attaching the first sleeve 312 to the rope 318 allows the rope 318 to be severed by applying force to one of the other of the two sleeves 314, 340, with tension from the rope 318 providing responding force from the first sleeve 312, thereby creating the compressive force F.

Although FIG. 6 shows the ends 326, 342 of the first sleeve 312 in a substantially parallel position, the angle of the ends 326, 342 are mutually exclusive. The angle of the first angular end 326 has no bearing on the angle of the additional angular end 342 and the angle of the additional angular end 342 has no bearing on the angle of the first angular end 326. Also, while the sharp objects 316, 350 are shown mounted within the first sleeve 312, the sharp objects 316, 350 may be located at the second angular end 330 of the second sleeve 314 and/or at the third angular end 348 of the third sleeve 340 without deviating from the scope of the invention.

Figure 7:
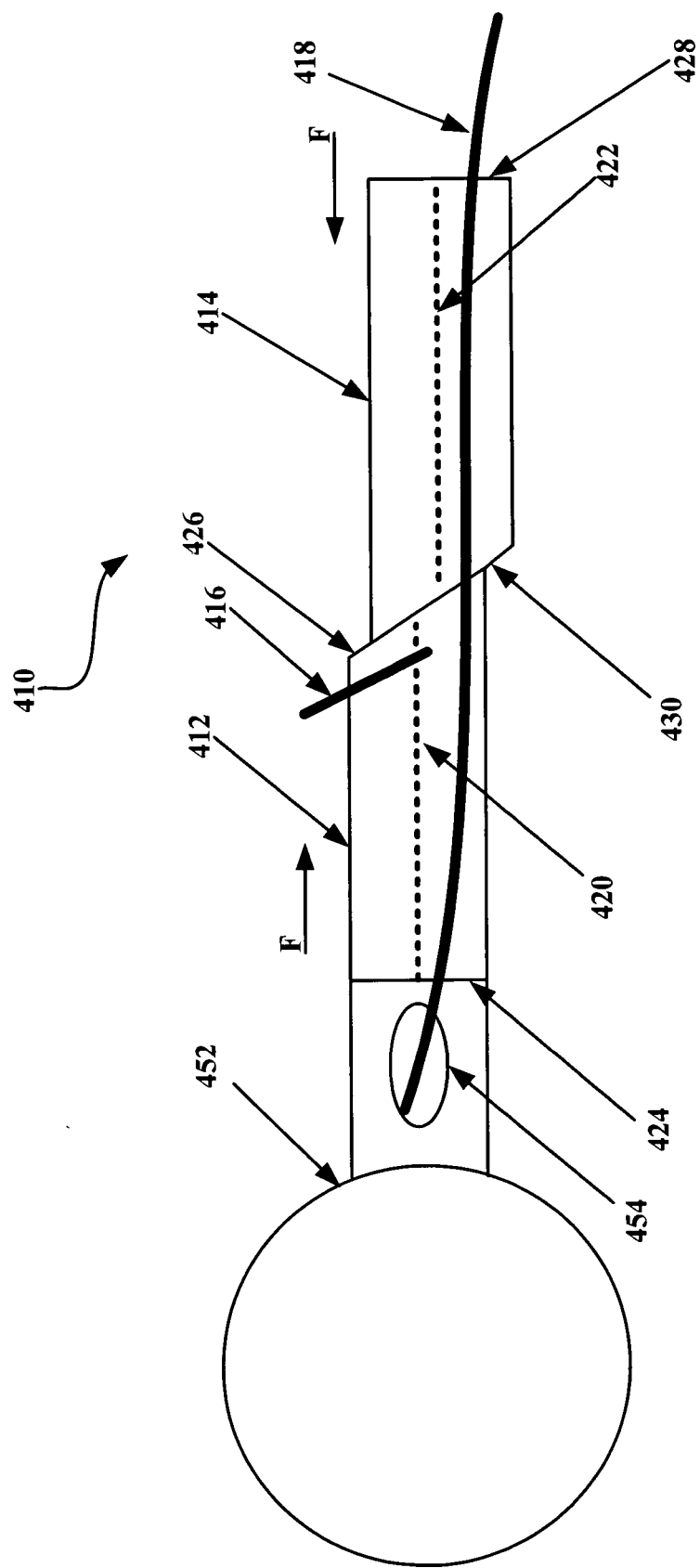
FIG. 7 is a cross-sectional view of the rope-severing device, in accordance with a fifth exemplary embodiment of the invention.

FIG. 7 is a cross-sectional view of the rope-severing device 410, in accordance with a fifth exemplary embodiment of the invention. The rope-severing device 410 may include a first sleeve 412 having a first axis 420, a buoy end 424 integral with a buoy 452, and a first angular end 426 that is oblique to the first axis 420. The rope-severing device 410 may also include a second sleeve 414 having a second axis 422, a second flat end 428 that is substantially perpendicular to the second axis 422, and a second angular end 430 that is oblique to the second axis 422. The angular ends 426, 430 may be at an angle approximately between twenty-five and seventy-five degrees, relative to the first and second axes 420, 422. The second sleeve 414 abuts the first sleeve 412 at the first and second angular ends 426, 430. The rope-severing device 410 may also include a sharp object 416 mounted at least partially within the first sleeve 412.

The buoy 452 may include a sleeve extension 454, allowing the rope 418 to be inserted into the first sleeve 412, pulled out through the sleeve extension 454, and tied off on the buoy 452. Another sharp object (not shown) may be mounted in the second sleeve 414 instead of, or in addition to, the sharp object 416 being mounted in the first sleeve 412. The first sleeve 412 may be connected to the buoy 452 by a swivel-type connector, such that the first sleeve 412 is free to swivel in relation to the buoy 452. By attaching the buoy 452 to the rope 418, the rope 418 may be severed by applying force to the second sleeve 414, with tension from the rope 418 providing responding force from the first sleeve 412, thereby creating the compressive force F.

Figure 8:
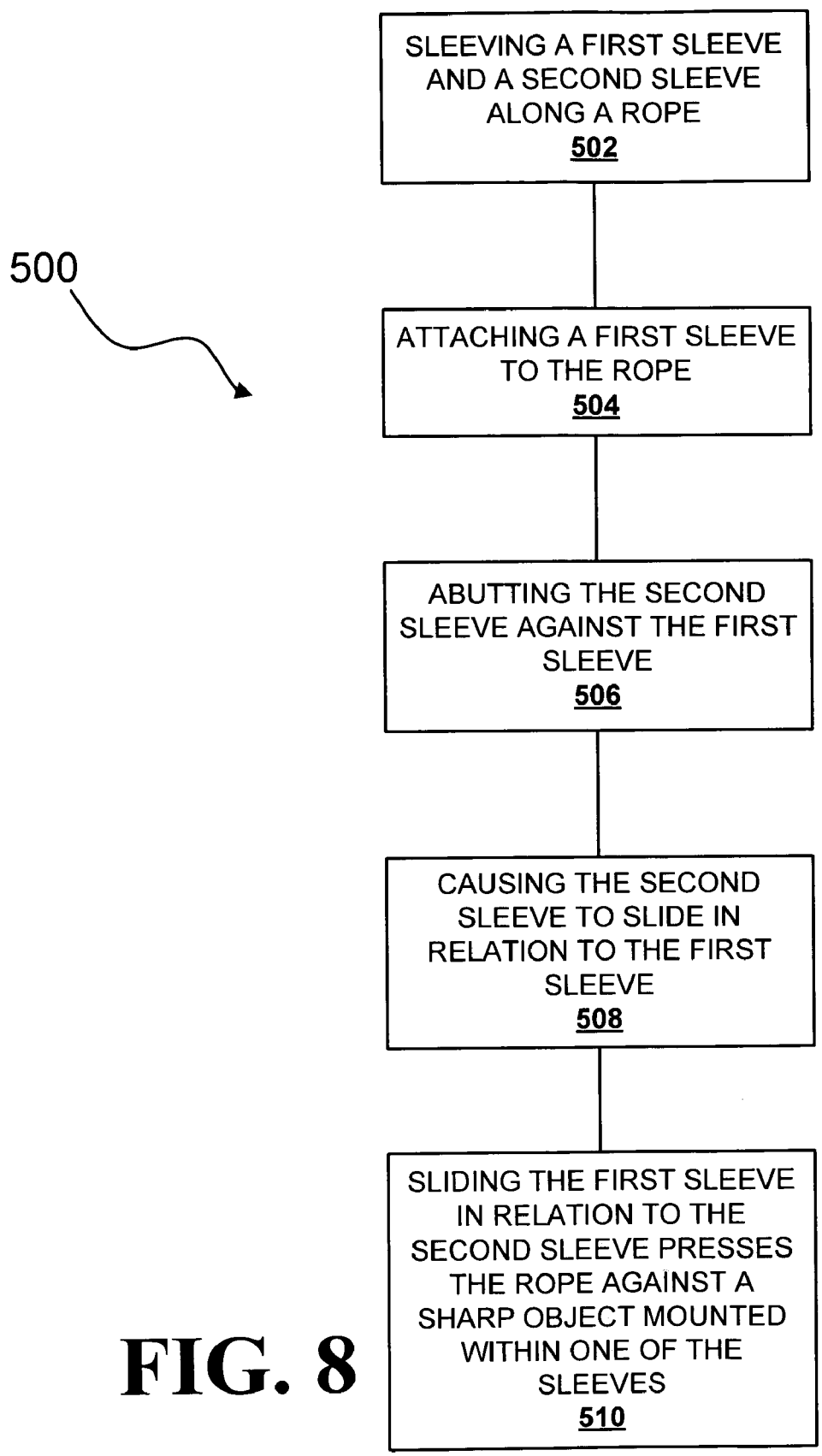
FIG. 8 is a flow chart showing the functionality and operation of a possible implementation of the rope-severing device, in accordance with the first exemplary embodiment of the invention.

The flow chart of FIG. 8 shows the functionality and operation of a possible implementation of the rope-severing device to sever a rope. In this regard, each block represents a module, segment, or step, which comprises one or more instructions for implementing the specified function. It should also be noted that in some alternative implementations, the functions noted in the blocks might occur out of the order noted in FIG. 8. For example, two blocks shown in succession in FIG. 8 may in fact be executed substantially, concurrently or the blocks may sometimes be executed in the reverse order, depending upon the functionality involved, as will be further clarified herein.

As shown in FIG. 8, a method 500 for severing a rope 18 is provided by the second embodiment of the invention. The method 500 requires sleeving a first sleeve 12 and a second sleeve 14 along a rope 18 (block 502). The first sleeve 12 is attached to the rope 18 (block 504). The second sleeve 14 is abutted against the first sleeve 12 (block 506). The first sleeve 12 is made to slide in relation to the second sleeve 14 (block 508). Sliding the first sleeve 12 in relation to the second sleeve 14 presses the rope 18 against a sharp object 16 mounted within one of the sleeves 12, 14 (block 510). The sharp object 16 severs the rope 18 as a result of these steps.

It should be emphasized that the above-described embodiments of the present invention, are merely possible examples of implementations, merely set forth for a clear understanding of the principles of the invention. Many variations and modifications may be made to the above-described embodiment of the invention without departing substantially from the spirit and principles of the invention. All such modifications and variations are intended to be included herein within the scope of this disclosure and the present invention and protected by the following claims.

I claim:
1. A rope-severing device, comprising:
   a first sleeve;
   a second sleeve abutting the first sleeve and slideably-oriented with the first sleeve wherein the first sleeve and the second sleeve abut at an oblique first sleeve edge and an oblique second sleeve edge; and
   a sharp object mounted at least partially within the first sleeve.
2. The rope-severing device of claim 1, wherein the first sleeve has a first axis and the second sleeve has a second axis, and wherein the first axis and the second axis are at least one of coaxial and parallel.
3. The rope-severing device of claim 1, further comprising a breakable restraint securing the first sleeve to the second sleeve.
4. The rope-severing device of claim 3, wherein the breakable restraint can withstand at least approximately twenty pounds of force.
5. The rope-severing device of claim 1, further comprising a rope attached to one of the first sleeve and second sleeve.
6. The rope-severing device of claim 1, wherein the first sleeve is attached to an underside of a buoy.
7. The rope-severing device of claim 1, wherein the first sleeve is integral with a buoy.
8. The rope-severing device of claim 1, further comprising a track slideably joining the first sleeve to the second sleeve.
9. A rope-severing device, comprising:
   a first sleeve having a first axis and a first angular end that is angular to the first axis wherein the first sleeve is swivelably connected to a buoy;
   a second sleeve having a second axis and a second angular end that is angular to the second axis, the second sleeve abutting the first sleeve at the first and second angular ends; and
   a sharp object mounted at least partially within the first sleeve.
10. The rope-severing device of claim 9, further comprising an attachment mechanism attached to one of the first sleeve and second sleeve, wherein the attachment mechanism attaches one of the first sleeve and the second sleeve to a rope.
11. The rope-severing device of claim 9, further comprising a track slideably joining the first sleeve to the second sleeve.
12. The rope-severing device of claim 9, further comprising a retaining member connected to both the first sleeve and the second sleeve, holding both sleeves in close proximity.
13. The rope-severing device of claim 9, further comprising:
   the first sleeve having an additional angular end that is angular to the first axis;
   a third sleeve having a third axis and a third angular end that is angular to the third axis, the third sleeve abutting the first sleeve at the additional and third angular ends; and
   a second sharp object mounted at least partially within the first sleeve, proximate to the additional angular end.

14. A method for severing a rope, the method comprising the steps of:
sleeving a first sleeve and a second sleeve along a rope;
attaching a first sleeve to the rope;
abutting the first sleeve against the second sleeve;
sliding the first sleeve against the second sleeve along an oblique angle relative to an axis of at least one of the sleeves; and
pressing a sharp object, mounted within one of the sleeves, against the rope.

15. The method for severing a rope of claim 14, further comprising restraining the first sleeve to the second sleeve, thereby holding the sleeves in an abutting position.

16. The method for severing a rope of claim 15, wherein the step of restraining further comprises restraining the first sleeve to the second sleeve with a breakable restraint.

17. The method for severing a rope of claim 16, further comprising the step of breaking the restraint preceding the step of sliding the first sleeve against the second sleeve.

18. A rope-severing device, comprising:
a first sleeve having a first axis and a first angular end that is angular to the first axis wherein the first sleeve is swivelably connected to a buoy;
a second sleeve having a second axis and a second angular end that is angular to the second axis, the second sleeve abutting the first sleeve at the first and second angular ends;
a sharp object mounted at least partially within the first sleeve; the first sleeve having an additional angular end that is angular to the first axis;
a third sleeve having a third axis and a third angular end that is angular to the third axis, the third sleeve abutting the first sleeve at the additional and third angular ends; and
a second sharp object mounted at least partially within the first sleeve, proximate to the additional angular end.

* * * * *